Dec. 21, 1954   L. C. CURRIER   2,697,345
METHOD FOR BALANCING WHEELS
Filed Feb. 16, 1951
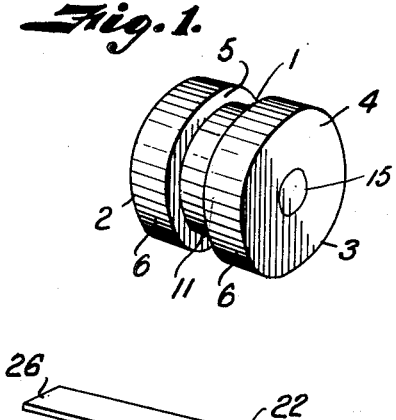
Fig. 1.
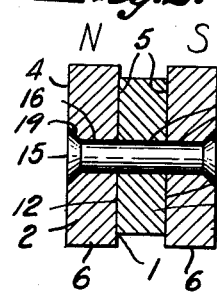
Fig. 2.
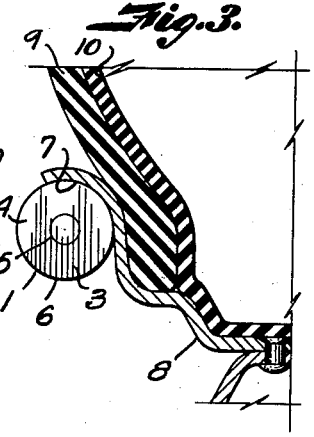
Fig. 3.
Fig. 4.
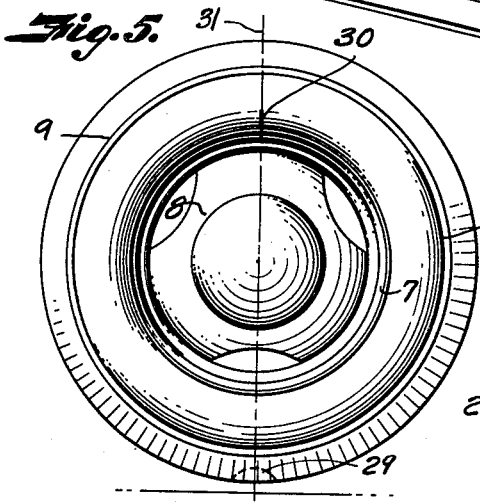
Fig. 5.
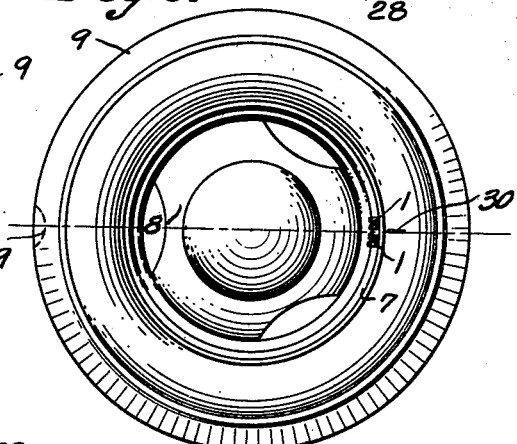
Fig. 6.
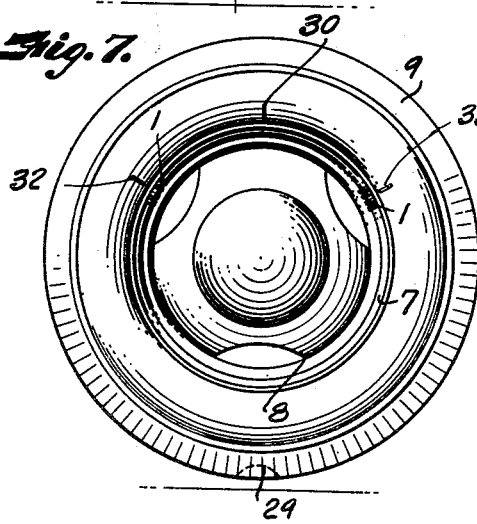
Fig. 7.
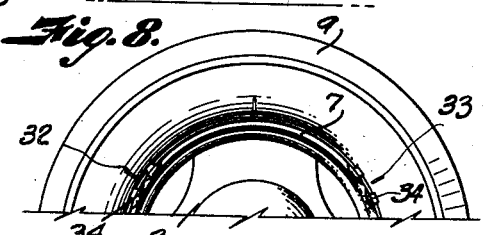
Fig. 8.
INVENTOR.
Loren C. Currier
BY
Fishburn & Mullendore
ATTORNEYS.

United States Patent Office 2,697,345
Patented Dec. 21, 1954

2,697,345

METHOD FOR BALANCING WHEELS

Loren C. Currier, Tulsa, Okla.

Application February 16, 1951, Serial No. 211,347

2 Claims. (Cl. 73—66)

This invention relates to a method for balancing vehicle wheels and has for its principal objects to provide a method of quickly and efficiently determining size and location of the balance weights required to balance a wheel under conditions in which the wheel operates and to provide a simple and inexpensive apparatus to aid in carrying out the method.

Another object of the invention is to provide a magnetic test weight adapted to be applied within the cavity of a wheel rim so that it is attached to the wheel by magnetism and not easily displaced during test of a wheel for balance but which is easily removed after the test is completed.

In accomplishing these and other objects of the invention hereinafter pointed out, I have provided an improved method and apparatus illustrated in the accompanying drawing wherein:

Fig. 1 is a perspective view of one of the magnetic test weights constructed in accordance with the present invention and used in my improved method.

Fig. 2 is a longitudinal section through the test weight.

Fig. 3 is a fragmentary cross section through a wheel rim and tire that is mounted thereon and which illustrates application of a test weight within the cavity of the wheel rim.

Fig. 4 is a perspective view of the gauge for locating the test weights relatively to the heavy side of a wheel.

Fig. 5 is a side elevational view of a wheel showing the step of determining the heavy side of the wheel.

Fig. 6 is a similar view showing the step of determining the weight required for balancing the heavy side of the wheel.

Fig. 7 is a similar view showing the step of locating the test weights and testing the wheel for balance with the test weights in position.

Fig. 8 is a partial elevational view of the wheel showing application of the permanent balancing weights.

Referring more in detail to the drawings:

1 designates a test weight constructed in accordance with the present invention and which is utilized in obtaining balance in a vehicle wheel as later described. The test weight 1 is of generally cylindrical shape and is composed of metal disk members 2 and 3 formed from a metal capable of being magnetized. The disks 2 and 3 have substantially flat side faces 4 and 5 and circumferential faces 6 conforming to the cross sectional curvature of the rim cavity 7 of a vehicle wheel 8, as best shown in Fig. 3, which mounts a usual tire 9 and inner tube 10. The test weight also includes a magnet 11 having end faces 12 and 13 corresponding with faces 5 of the disk members 2 and 3. The member 11 has a peripheral face 14 of smaller diameter than the peripheral faces 6 of the disk members 2 and 3 whereby the peripheral faces 6 of the disk members 2 and 3 constitute the pole faces of the magnet when the disk members are connected together by means of a rivet or like 15 that extends through registering axial openings 16, 17 and 18 in the respective disk member and which has its outer ends riveted or pinned within tapered counterbores 19 and 20 in the outer faces 4 of the disk members 2 and 3, as clearly shown in Fig. 2. The magnetic test weights as above described are provided in two or more sets of different sizes, for example, 1, 2, and 3 oz., so as to assure a sufficient number and size of weights to give the required combination as later described.

21 designates a gauge or measuring device consisting of a thin flat flexible strip having a flat face 22 provided with transverse markings 23 and 24 at one end 25 that are located from the opposite end 26 distances corresponding with 1/6 of the circumference of standard 15 and 16 inch wheel rims, the markings 23 and 24 being designated by 15" and 16" as indicated at 27 and 28.

In carrying out my improved method, the wheels 8 of a vehicle are balanced in position on their respective spindles or axles. A wheel to be balanced is raised by means of a jack or the like so that it will turn freely on its axle or spindle with the heavy side moving to a lowermost position directly below the axis of the wheel as indicated by the dotted lines designated 29 in Fig. 5. A mark designated 30 is then applied to the opposite diametric side of the wheel directly in line with a vertical plane extending through the axis of the wheel and indicated by the dot and dash line 31. The wheel is then turned to bring the heavy side 29 and mark 30 into a horizontal position as shown in Fig. 6. Test weights 1 are then applied to the concavity 7 of the wheel rim at the respective sides of the mark 30. For example, test weights of one-ounce may be first tried and if they are not sufficient to effect a balance with the heavy side of the wheel and maintain the heavy point and mark in horizontal position, the one-ounce weights may be removed and substituted by two-ounce weights or other test weights may be selected and added in end-to-end relation until the wheel is balanced in the position shown in Fig. 6. The magnetism produced in the pole faces causes the weight to grip the wheel rim and retain their position while a balance is being effected.

After a balance has been ascertained, the total amount of the test weights is noted for determining the weight of the conventional wheel balance weights which are to be permanently attached to the wheel.

It has been determined that the best practice is to mount the balance weights at points 120° from the respective sides of the heavy point of the wheel, the gauge or measuring strip is now utilized to determine the location of the balance weights in these positions. The test weights shown in Fig. 6 are then removed from the wheel and the wheel is allowed to turn under the influence of the heavy side so that the heavy side is lower-most as shown in Fig. 7. The measuring strip is then applied within the concave portion of the rim 7 with the end 26 registering with the mark 30. The strip is then curved to follow the curvature of the rim so that a mark 32 may be made on the tire in alignment with one or the other of the measure marks 23 or 24, depending upon the size of the wheel. A mark 33 is then made at the opposite side in a similar manner with the aid of the measuring strip. The marks 32 and 33 will then be located substantially equal from an axial plane extending through the heavy side of the wheel and when the wheel is turned to the position shown in Fig. 6, the marks 32 and 33 will be located above and below the horizontal radius of the wheel and in vertical alignment with midpoint of the horizontal radius.

It is therefore obvious that to balance the wheel in this position, the required number and value of test weights which were needed to balance the wheel at the point of the mark 30 must be applied adjacent to each of the marks 32 and 33, as shown in Fig. 7. This is because the length of the leverage tending to balance the wheel has been reduced by one-half and consequently the power of the test weights must double in order to effect the same balance with the heavy side of the wheel. After applying the number and size of test weights as previously ascertained to the rim adjacent the marks 32 and 33 the wheel is turned to test the balance thereof. If the wheel is in balance, it will stop in any position, however, if it is out of balance, the wheel will turn so that the heavy side or the test weights will be lower-most. If the heavy side is lower-most, then the magnetic test weights are shifted slightly around the periphery of the rim in the direction of the light side until a balance is effected. If the wheel turns so that the test weights are lower-most then the test weights are shifted in the opposite direction until a balance is effected. When the wheel balance is determined as to size and location of the weight required, permanent weights as designated at 34 in Fig. 8 are applied in number and weight to correspond with the test weights.

The permanent weights may be of any conventional type heretofore used in balancing a wheel.

From the foregoing, it is obvious that I have provided a simple and inexpensive method and apparatus for ascertaining weight and location of the weights required to balance a wheel while the wheel is in its position on its axle or spindle, thereby assuring accurate balance when corresponding permanent weights are attached.

What I claim and desire to secure by Letters Patent is:

1. The method of test balancing a wheel having a rim and an inflated pneumatic tire in place on the rim and with the wheel mounted on its axis of rotation, including freeing the wheel for rotation responsive to gravity to bring the heavy side of the wheel into its lowermost position relatively to the axis of rotation, marking a point on the upper portion of the rim diametrically opposite to the heavy side to designate the light side of the wheel, magnetically attaching a test weight on the light side of the wheel and within a curvature of the rim adjacent said mark so that the weight and heavy side of the wheel are at opposite ends of a diameter of the rim to balance the wheel, noting the weight of the test weight, measuring an arc of approximately equal to one-sixth the circumference of the rim in both arcuate directions from the first marking to determine location of permanent balance weights, permanently applying balance weights to said rim at each location of substantially equal weight to the total weight of the test weight, and removing the test weight.

2. The method of test balancing a wheel having a rim and an inflated pneumatic tire in place on the rim and with the wheel mounted on its axis of rotation, including freeing the wheel for rotation responsive to gravity to bring the heavy side of the wheel into its lowermost position relatively to the axis of rotation, marking a point on the upper portion of the rim diametrically opposite to the heavy side to designate the light side of the wheel, magnetically attaching magnetic test weights on the light side of the wheel and within a curvature of the rim adjacent said mark until the light side balances with the heavy side of the wheel when the wheel is turned on its axis, removing the magnetic test weights, locating points on the circumference of said rim in opposite arcuate directions from said mark approximately equal to one-sixth the circumference of the rim, applying magnetic check weights within the curvature of the rim at each of said points substantially equal to the total weight of the test weights to check balance the wheel, removing the magnetic check weights, and applying permanent weights to the rim at the points of check balance having substantially the same weight as the check balance weights which were applied at said points.

References Cited in the file of this patent

UNITED STATES PATENTS

| Number | Name | Date |
|---|---|---|
| 1,801,989 | Wells et al. | Apr. 21, 1931 |
| 1,842,141 | Batie | Jan. 19, 1932 |
| 2,029,561 | Du Sang | Feb. 4, 1936 |
| 2,052,295 | Hume | Aug. 25, 1936 |
| 2,176,269 | Morse | Oct. 17, 1939 |
| 2,313,339 | Hare | Mar. 9, 1943 |
| 2,349,552 | Holmes | May 23, 1944 |
| 2,529,099 | Olbrys | Nov. 7, 1950 |
| 2,532,372 | Sanders | Dec. 5, 1950 |
| 2,548,842 | McCrorey | Apr. 10, 1951 |
| 2,585,140 | Leneki | Feb. 12, 1952 |
| 2,587,402 | Steel | Feb. 26, 1952 |
| 2,613,532 | Jones | Oct. 14, 1952 |
| 2,613,533 | Jones | Oct. 14, 1952 |